United States Patent
Monnier

[11] Patent Number: 6,076,498
[45] Date of Patent: Jun. 20, 2000

[54] DIRECT-INJECTION SPARK-IGNITION FOUR-STROKE INTERNAL-COMBUSTION ENGINE

[75] Inventor: Gaëtan Monnier, Carrières sous Poissy, France

[73] Assignee: Institut Francais du Petrole Rueil-Malmaison, Cedex, France

[21] Appl. No.: 09/274,866

[22] Filed: Mar. 23, 1999

[30] Foreign Application Priority Data

Mar. 26, 1998 [FR] France ................................ 98/03.880

[51] Int. Cl.⁷ ........................................................ F02B 5/00
[52] U.S. Cl. ............................................ 123/305; 123/298
[58] Field of Search ................................ 123/295, 298, 123/305, 301, 302, 636, 638

[56] References Cited

U.S. PATENT DOCUMENTS

| | | | |
|---|---|---|---|
| 4,216,745 | 8/1980 | Latter et al. ........................ | 123/26 |
| 4,543,929 | 10/1985 | Kataoka et al. ..................... | 123/263 |
| 5,127,379 | 7/1992 | Kobayashi et al. .................. | 123/302 |
| 5,211,145 | 5/1993 | Ichikawa et al. .................... | 123/305 |
| 5,327,864 | 7/1994 | Regueiro ............................. | 123/260 |
| 5,720,253 | 2/1998 | Matoba et al. ...................... | 123/298 |
| 5,913,297 | 6/1999 | Jingu ................................... | 123/295 |

FOREIGN PATENT DOCUMENTS

| | | | |
|---|---|---|---|
| 0824185 | 2/1998 | European Pat. Off. .......... | F02B 2/31 |
| 19508986 | 4/1996 | Germany ......................... | F02F 1/36 |
| 61-252851 | 11/1986 | Japan ............................... | 123/295 |
| 6-147022 | 5/1994 | Japan ............................... | 123/295 |
| 6-207542 | 7/1994 | Japan ............................... | 123/295 |

*Primary Examiner*—Erick R. Solis
*Attorney, Agent, or Firm*—Antonelli, Terry, Stout & Kraus, LLP

[57] ABSTRACT

A direct-injection spark-ignition four-stroke internal-combustion engine includes a combustion chamber defined by a piston, a cylinder with a cylinder head, an intake pipe associated with an intake valve, an exhaust pipe with which an exhaust valve cooperates, and a first ignition device situated close to intake valve. The engine further includes a fuel injection element situated close to the first ignition device, with the intake pipe, the fuel injection element, and the first ignition device being situated in the same half of the cylinder head. The fuel injection element may be placed below the first ignition device. A second ignition device may be positioned in the half of the cylinder head containing the exhaust valve.

9 Claims, 2 Drawing Sheets

DIRECT-INJECTION SPARK-IGNITION FOUR-STROKE INTERNAL-COMBUSTION ENGINE

FIELD OF THE INVENTION

The present invention relates to the field of spark-ignition four-stroke internal-combustion engines, particularly such engines with direct fuel injection into the combustion chamber.

In this type of engines, the fuel is injected directly into the combustion chamber and not, as in other engines, into the intake pipe(s). Direct fuel injection allows better control of combustion insofar as the fuel-injection nozzles can react and be controlled according to the engine cycle.

BACKGROUND OF THE INVENTION

Many engines have already been designed to that end. There are thus well-known spark-ignition four-stroke engines with four valves per cylinder, a spark plug situated in the cylinder with the cylinder head on the longitudinal axis of the cylinder having intake pipes positioned running substantially parallel to the axis of the cylinder, and into which the fuel-injection nozzle opens just below the intake valves.

The piston associated with these engines commonly has a specific hollow intended to channel the injection nozzle jet and to intensify the motion of the gases in the combustion chamber.

There are also well-known engines whose piston has a spherical bowl (or hollow) situated, at the top dead center, just opposite the fuel-injection nozzle and the spark plug. Patent application EP-A1-0,558,072 describes an engine with this characteristic.

All these engines have large capacities (cylinder bores above 80 mm) and they commonly have four valves per cylinder.

There are also well-known engines of the same type but with three valves per cylinder. Patent application EN.97/06, 731 filed in the name of the applicant illustrates a particular example of such engines.

They allow combustion in a stratified mode at low loads and/or so-called homogeneous combustion at high loads.

The combustion is referred to as stratified when a zone of the combustion chamber contains a richer mixture than the rest of the chamber, at low loads. This allows easier ignition of the mixture since the fuel-enriched zone is globally close to the spark plug.

At high loads, so-called homogeneous combustion is recommended. The mixture then has to be very homogeneous in the whole of the combustion chamber.

Direct injection engines currently work properly either in one mode or in the other. It is generally difficult to reconcile both operating modes.

SUMMARY OF THE INVENTION

The present invention relates to the type of engine described above and solves some of the associated problems.

More precisely, the present invention allows reduction of the fuel consumption by decreasing the pumping work. Furthermore, heat transfer in and around the combustion chamber is greatly reduced according to the present invention.

The present invention specifically relates to stratified-combustion direct-injection engines having small-sized cylinders, two valves and a central valve-actuating mechanism.

The object of the present invention thus is to provide a direct-injection spark-ignition four-stroke internal-combustion engine including comprising at least a combustion chamber defined by by a piston, a cylinder and a cylinder head, an intake pipe associated with an intake valve, an exhaust pipe with which an exhaust valve cooperates, and a first ignition means situated close to the intake valve.

According to the invention, the engine further includes a fuel injection element situated close to said ignition means, the intake pipe, the injection element and the first ignition means being situated in the same half cylinder, on the front side of the vehicle.

Furthermore, the profile of the upper face of the piston is similar to that of the lower face of the cylinder head, and said piston has a hollow situated close to the area into which said first ignition means opens.

In particular, the hollow in the piston has a spherical or semi-spherical shape.

According to the invention, said intake valve and said exhaust valve are diametrically opposite each other.

The axis of the injection element is preferably situated less than 60° from the plane containing the longitudinal axis of the cylinder.

According to another embodiment of the invention, the engine also includes a second ignition means.

The second ignition means is thus situated in the half cylinder that contains the exhaust valve.

More precisely, the second ignition means is situated next to the exhaust valve.

BRIEF DESCRIPTION OF THE DRAWINGS

Other features, details and advantages of the invention will be clear from reading the description hereafter, given by way of non limitative example, with reference to the accompanying drawings wherein.

DETAILED DESCRIPTION OF THE INVENTION

Figure 1A:
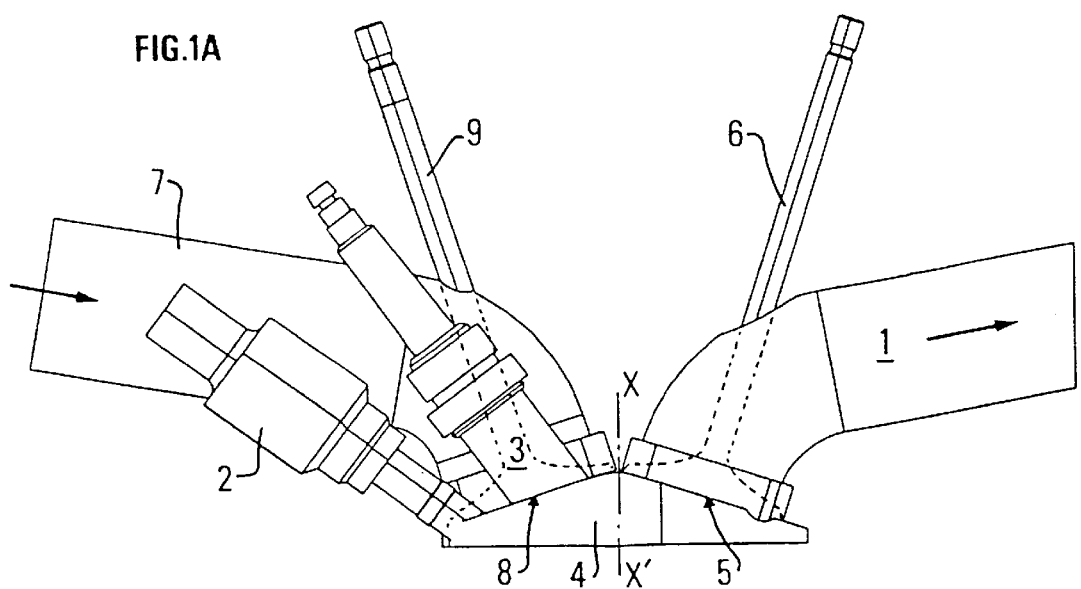
FIG. 1A depicts a simplified section of the upper part of a combustion chamber according to the invention.

FIG. 1A depicts a section along a plane passing through the axes of exhaust pipe 1, fuel-injection nozzle 2 and a first ignition means 3. These three elements open into the upper part of combustion chamber 4 conventionally delimited by the cylinder head, the upper face of the piston and the cylinder (not shown).

Exhaust pipe 1 opens into combustion chamber 4 through a port 5; said port 5 is intermittently sealed by a means such as a valve 6.

Moreover, the present invention includes an intake pipe 7 that opens into the combustion chamber through a specific port 8. An intermittent sealing element 9 such as a valve is associated with intake port 8.

According to the invention, intake pipe 7, fuel-injection nozzle 2 and first ignition means 3 are placed in the same half cylinder on the front side of the vehicle. This induces easy dismantling of fuel-injection nozzle 2 and of ignition means 3.

Furthermore, this layout allows creation, in combustion chamber 4 of, a motion referred to as swirl, i.e. a rotation of the gaseous stream around the axis of the cylinder.

Figure 1B:
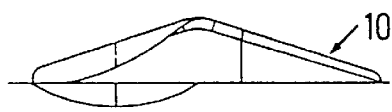
FIG. 1B is a cross-section of the upper part of the piston.

FIG. 1B shows the upper profile of the associated piston 10.

Figure 2:
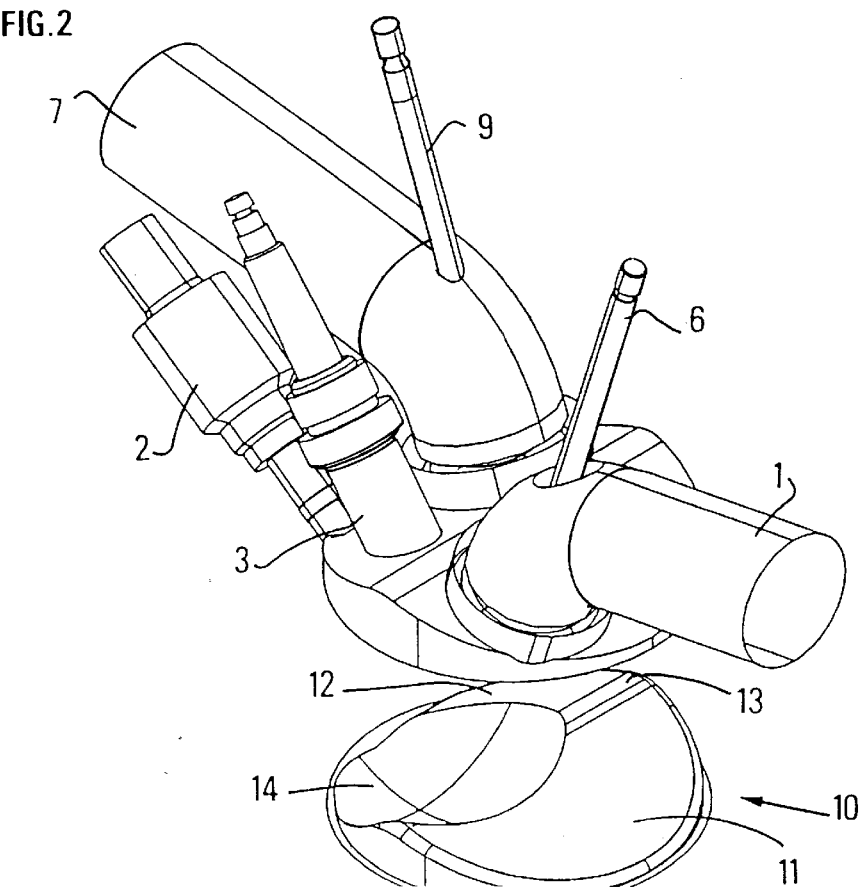
FIG. 2 is a simplified perspective view of the cylinder head-upper part of the piston zone according to a first embodiment of the invention.

This profile can also be seen in the perspective of FIG. 2.

The upper face of piston 10 thus includes two slopes 11, 12 that join in the upper part in the neighbourhood of an edge 13. This shape substantially corresponds to that of the lower face of the cylinder head, also shaped like a roof with two sloping sides.

Exhaust pipe 1 opens onto one of the slopes 11, toward the rear side of the vehicle.

Intake pipe 7, fuel-injection nozzle 2 and first ignition means 3, all of which thus belong to the same half cylinder, open onto the second slope 12, toward the front side of the vehicle.

The axis of fuel-injection nozzle 2 is preferably situated less than 60° from the plane containing the longitudinal axis of the cylinder. This positioning is considered to be "close" to the axis of the cylinder. It allows combustion to take place more in the centre of the combustion chamber, hence a better combustion efficiency, because a minimum contact thus exists between the flame and the walls of the combustion chamber.

Furthermore, a sphere portion 14 is cut in the upper face of piston 10. More precisely, this hollow 14 is situated opposite fuel-injection nozzle 2 and first ignition means 3 so as to favour stratification of the mixture of fuel and air in the combustion chamber during late injection operation, i.e. injection close to the combustion top dead centre.

The present invention thus provides an internal-combustion engine with two valves, an intake valve and an exhaust valve, that can work both in a homogeneous combustion mode and in a stratified combustion mode. This allows considerable fuel consumption gains.

The invention is more particularly aimed at small-capacity vehicles.

The camshaft, not shown in the figures, is central, i.e. it is placed substantially above the top of combustion chamber 4.

Furthermore, the axis of ignition means 3 being preferably "close" to the plane containing the axis of the cylinder, the ignition means itself can be placed in the immediate vicinity of the centre of the cylinder, which is a way to improve combustion.

According to another embodiment of the invention, a second ignition means 15 is provided.

Figure 3:
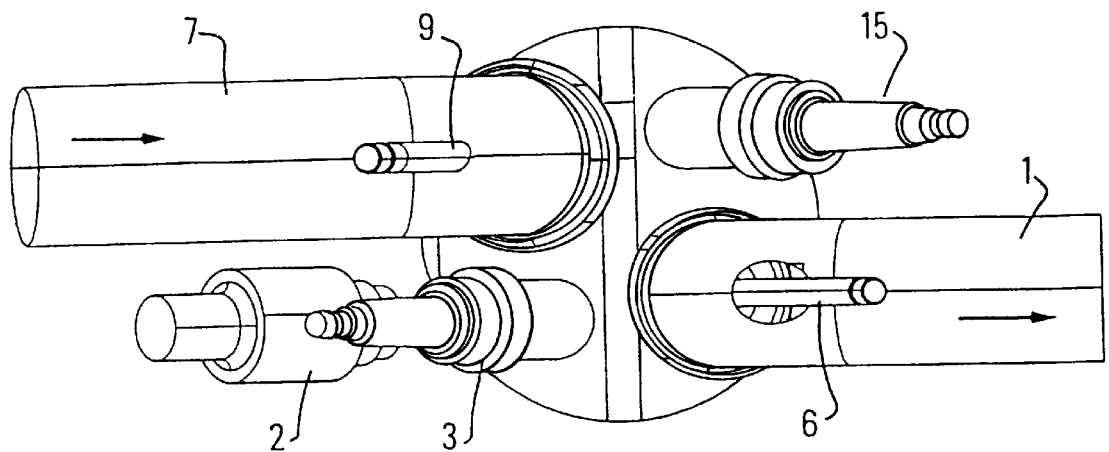
FIG. 3 is a top view of a second embodiment of the invention.
Figure 4:
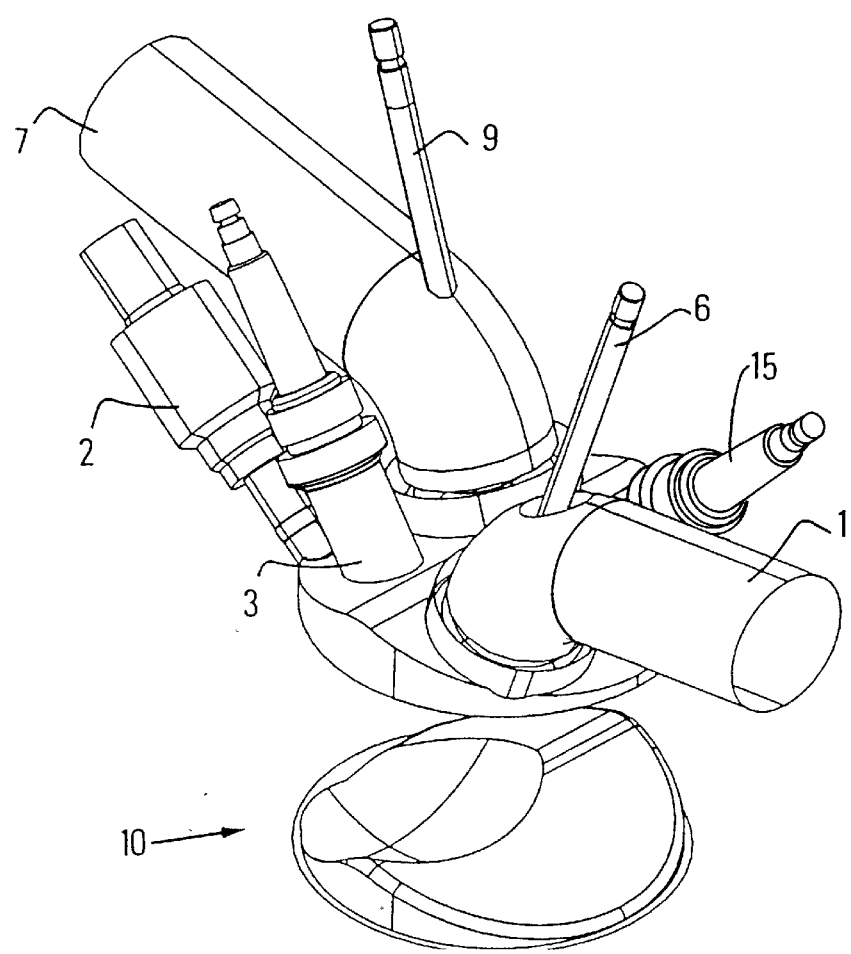
FIG. 4 is a simplified perspective view of the second embodiment of the invention, on the cylinder head side.

FIGS. 3 and 4 illustrate this embodiment.

Second ignition means 15 preferably opens into the second half cylinder that does not contain intake pipe 7, fuel-injection nozzle 2 and first ignition means 3. Second ignition means 15 therefore opens into the same half cylinder as exhaust pipe 1, on the rear side of the vehicle.

Second ignition means 15 allows combustion to be improved. It is preferably used in order to prevent knocking phenomena at high engine loads and it thus allows a high compression ratio, favouring engine efficiency. Second ignition means 15 amplifies ignition in the centre of the combustion chamber.

It also allows use of advanced ignition to improve combustion during part-load operation under stoichiometric conditions.

FIG. 4 shows the layout of this second embodiment of the invention, with two ignition means (3 and 15).

The upper face of piston 10 preferably has the profile described above, although the latter is not necessarily implemented.

Fuel-injection nozzle 2 preferably has a reduced spray angle, i.e. of the order of 40°. However, in the case of an offset-jet nozzle, i.e. with a principal axis different from the axis of the exterior body, the injection angle is no longer limited by the problem of cylinder wall wetting. The fuel jet can thus be advantageously pointed at the centre of the combustion chamber or at one of the ignition means.

I claim:

1. A direct-injection spark-ignition four-stroke internal-combustion engine comprising a combustion chamber, including a piston, a cylinder with a cylinder head, an intake pipe, an intake valve for controlling flow from said intake pipe into said cylinder an exhaust pipe, an exhaust valve for controlling flow from said cylinder into said exhaust pipe, a first ignition means positioned close to said intake valve, and a fuel injection element positioned close to and below said first ignition means, with said intake pipe, said injection element, and said first ignition means being positioned on the same half of said cylinder head, to one side of the plane containing the axis of the cylinder.

2. An engine as claimed in claim 1, wherein the upper face of said piston has a profile similar to that of the lower face of said cylinder head and further has a hollow situated close to the area onto which said first ignition means opens.

3. An engine as claimed in claim 2, wherein the hollow in said piston has a spherical or semi-spherical shape.

4. An engine as claimed in claim 1, wherein said intake valve and said exhaust valve are positioned diametrically opposite each other.

5. An engine as claimed in claim 1, wherein the axis of said injection element is positioned at an angle less than 60° from the plane containing the longitudinal axis of the cylinder.

6. An engine as claimed in claim 1, further comprising a second ignition means.

7. An engine as claimed in claim 6, wherein said second ignition means is positioned in the half of the cylinder head containing said exhaust valve.

8. An engine as claimed in claim 6, wherein said second ignition means is positioned next to said exhaust valve.

9. An engine as claimed in claim 1, wherein said half of said cylinder head is toward the front of the vehicle.

* * * * *